April 24, 1956  S. NIELSEN  2,743,006
CONVEYING APPARATUS
Original Filed Jan. 28, 1949
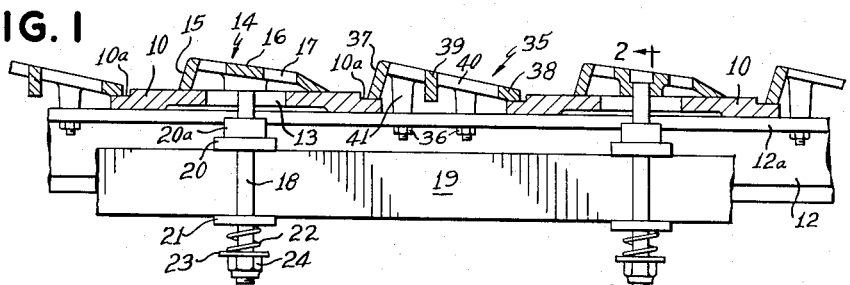
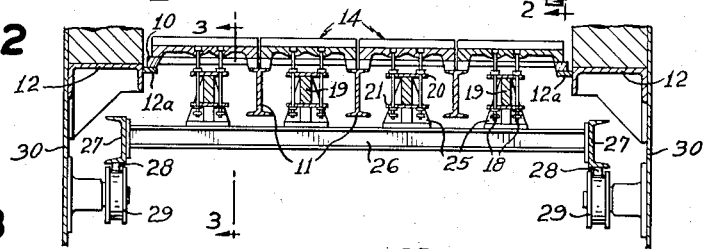
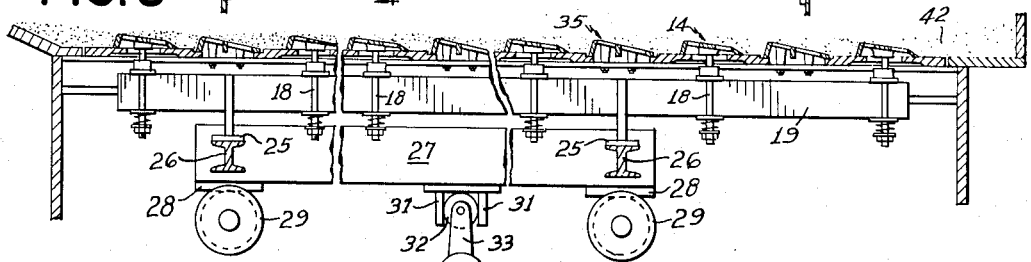
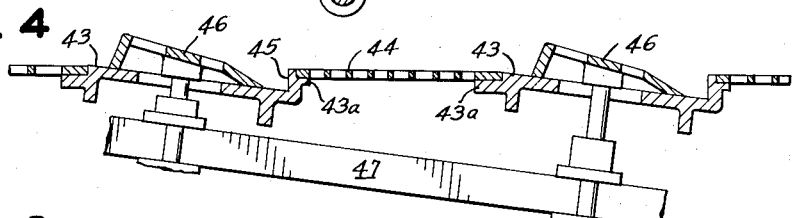
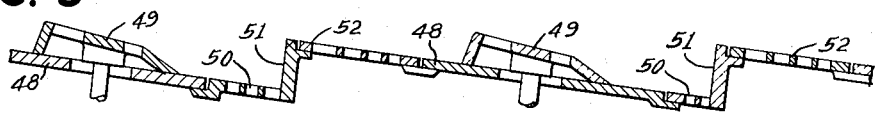
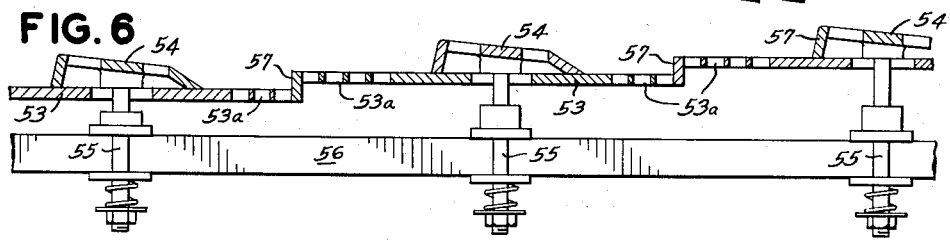
INVENTOR.
Sigurd Nielsen
BY
Pennie Edmonds Morton & Barrows
ATTORNEYS

United States Patent Office 2,743,006
Patented Apr. 24, 1956

2,743,006

CONVEYING APPARATUS

Sigurd Nielsen, Copenhagen, Denmark, assignor to F. L. Smidth & Co., New York, N. Y., a corporation of New Jersey Original application January 28, 1949, Serial No. 73,307. Divided and this application June 2, 1953, Serial No. 359,059

10 Claims. (Cl. 198—218)

This invention relates to conveyors for bulk materials and of the type in which the materials being conveyed lie upon a stationary support and are advanced by reciprocating elements. More particularly, the invention is concerned with a novel conveyor, which is generally similar to that disclosed in my United States Patent No. 2,498,218, but differs therefrom in various features, the use of which results in greater improved performance. The present application is a division of my copending application Serial No. 73,307, filed January 28, 1949, and now abandoned.

The conveyor of the above patent includes a generally horizontal support, which includes a plurality of bearing members spaced lengthwise along it and extending transversely. Each bearing member has a bearing surface at its top and an opening through the bearing surface. A conveying element rests on each bearing surface and is connected through the opening in the surface to a structure mounted beneath the support for reciprocation lengthwise only of the support. Each conveying element has a steep front face and tapers in height to the rear, so that, as the element is moved forwardly on its bearing surface, its front face engages and advances the material, while, on its return movement, the element slides under the material.

In the use of the apparatus of the prior patent, it has been found that, even though the top of each conveying element slopes downwardly to the rear at a low angle, the group of elements in their return movement convey some of the material to the rear. This return movement of the material cuts down the conveying capacity of the apparatus and increases the power required for conveying purposes.

The present invention is directed to the provision of a conveying apparatus of the type described, in which return movement of the material is prevented without any considerable resistance being offered to its forward movement. In the new apparatus, the return movement of the material is prevented by means of stationary checking members, which are mounted in alternation with the bearing members. The checking members may take various forms but, in all instances, they include substantially vertical surfaces extending transversely of the direction of movement of the material. In the new conveyor, the advance of the conveying elements causes the material to advance with them over and past the checking members, and, on the return movement of the elements, the material is held against backward movement by the checking members and the elements slide beneath the material.

For a better understanding of the invention, reference may be made to the accompanying drawings, in which Fig. 1 is a longitudinal vertical sectional view through a part of one form of apparatus;

Fig. 2 is a sectional view on the line 2—2 of Fig. 1;

Fig. 3 is a longitudinal sectional view on the line 3—3 of Fig. 2;

Fig. 4 is a fragmentary longitudinal vertical sectional view of a preferred form of the apparatus;

Fig. 5 is a fragmentary longitudinal vertical sectional view of a modified form of the apparatus; and Fig. 6 is a further fragmentary longitudinal vertical section view of a modified form of the apparatus.

The apparatus in the form illustrated in Figs. 1–3, inc., comprises a stationary support, which includes a plurality of bearing members 10 arranged in transverse rows. The end members of each row are supported on longitudinal central beams 11 and longitudinal flanges 12a on side beams 12 forming part of the housing for the apparatus, while intermediate bearing plates are mounted on beams 11 to span the spaces between them. Each bearing plate 10 is formed with a central opening 13 and a conveying element 14 rests upon the plate and covers the opening. The element has a steep front face 15 and its top surface 16 slopes downwardly at a low angle to the rear and may be formed, if desired, with a plurality of openings 17. Each element is provided with a pair of bolts 18, which extend downwardly on either side of one of a number of longitudinal beams 19. Each bolt passes through upper and lower transverse members 20, 21 engaging the top and bottom, respectively, of a beam 19, and, below member 21, the bolt is encircled by a spring 22 bearing at one end against member 21 and at the other against a washer 23 engaging the nut 24 on the end of the bolt. Each bolt also passes through a bushing 20a attached to the upper surface of transverse member 20.

The beams 19 are secured by brackets 25 to transverse beams 26, each end of which is secured to a longitudinal beam 27 having lengths of rail 28 secured to its under surface. The rails rest in channels in wheels 29 pivotally mounted on the walls 30 of the housing. Each beam 27 is provided with a pair of spaced lugs 31 extending downwardly from its bottom surface, and a roller 32 on an arm 33 carried by a rock shaft 34 lies between the lugs. As shaft 34 is rocked, the assembly lying beneath the support and comprising longitudinal beams 19, transverse beams 26, and longitudinal beams 27, is reciprocated on wheels 29. As the structure reciprocates horizontally, the conveying elements 14 are reciprocated on the bearing members 10, while being held tightly against the upper surfaces of their bearing members by springs 22.

The bearing members 10 are provided with transverse flanges 10a along their front and rear edges, and stationary checking members 35 are mounted in transverse rows between bearing members in adjacent transverse rows to rest upon the flanges thereof. The checking members are secured in place by bolts 36, which pass through openings in the flanges of beams 11 and the flanges 12a of beams 12. Each checking member is similar in form to a conveying element 14 and has a steep front face 37, a rear wall 38, and a transverse rib 39 connected to the front and rear walls by spaced ribs 40. The top of each checking member slopes downwardly at a low angle from the top of its front wall 37. The bolts 36 lie within reinforcements 41 attached to end walls connecting the front and rear wall of each checking member.

In the operation of the apparatus described, the material 42 to be conveyed is deposited on the support at one end thereof and, as the structure beneath the support is reciprocated, the front face 15 of each conveying element engages the material and advances it. In such movement, some of the material is forced over the checking members and deposited in front of the front faces 37 thereof. As the conveying elements move back, their upper surfaces tend to slide beneath the material and backward movement of the material with the elements is prevented by the front walls of the checking members behind the conveying elements. As the tops of the checking members slope down at a low angle to the rear, the members interpose little resistance to the forward movement of the material with the conveying elements.

In the preferred construction shown in Fig. 4, the bearing members 43 have downwardly and backwardly inclined top surfaces and adjacent members are connected by a flat grate 44 supported on flanges 43a of the members. Each bearing member has a vertical wall 45 at its rear end and this wall, together with a grate, forms a checking member similar to member 35, above described. Conveying elements 46 of the same general form as elements 14 are mounted on the bearing members 43 and are mounted on sloping longitudinal beams 47 corresponding to beams 19. In the operation of the apparatus, the reciprocation of the conveying elements 46 causes the material to be advanced by the front face of each element along the bearing member for the element and along the grate in front of the bearing member. As the material reaches the end of the grate, it drops down in front of wall 45 of the next bearing member and, on the return movement of the conveying elements, the material cannot be forced backwardly past walls 45. The material on the grates between adjacent bearing members, accordingly, remains at rest.

In the modified construction shown in Fig. 5, each bearing member 48 is inclined downwardly to the rear and carries a conveying element 49 similar to elements 14. Between adjacent bearing members, there is a checking member made of two parts, one of which includes a grate 50 extending downwardly from the rear of each bearing member and a substantially vertical wall 51 rising from the rear end of the grate. The second part of each checking member consists of a grate 52, which extends downwardly to the rear from the top of wall 51 to the forward end of the next bearing member 48. With this construction, the material is advanced by the conveying members along grates 52 and falls on grates 50 in front of walls 51. On the return movement of the conveying elements, the material is checked by walls 51.

Both the bearing members 43 and the bearing members 48, shown in Figs. 4 and 5, slope downwardly and together with their respective adjacent walls 45, 51 assist in checking the backward movement of the bulk material. The constructions shown in both Figs. 4 and 5 incorporate therefore checking surfaces by reason of the downward slope of each of the bearing members while maintaining a generally horizontal conveying surface and thereby eliminate the necessity for providing separable adjustable checking members, as shown in Figs. 1 through 3. Such simple arrangements reduce the number of parts necessary to provide checking surfaces and also enable the incorporation of one or more simply fabricated grates which serve to convey gases upwardly through the conveyor structure and cool the material as it is periodically advanced along the conveyor.

I claim:

1. Apparatus for conveying material in bulk, which comprises a substantially continuous, generally horizontal support including transverse bearing members having upwardly and forwardly inclined bearing surfaces at its top with a central opening therethrough, means providing steep checking walls at the rear ends of the bearing members, a structure beneath the support mounted for reciprocating lengthwise only of the support, a conveying element resting on the bearing surface of each bearing member, the element having a steep front face and tapering in height to the rear, and means extending through the openings in the bearing members for connecting the conveying elements to the structure to reciprocate therewith, the elements maintaining contact with their respective bearing surfaces during their reciprocation.

2. Apparatus for conveying material in bulk, which comprises a substantially continuous, generally horizontal support including transverse bearing members having upwardly and forwardly inclined bearing surfaces at its top with a central opening therethrough, means providing steep checking walls at the rear ends of the bearing members, such means having a top sloping downwardly to the rear from said steep checking walls, a structure beneath the support mounted for reciprocating lengthwise only of the support, a conveying element resting on the bearing surface of each bearing member, the element having a steep front face and tapering in height to the rear, and means extending through the openings in the bearing members for connecting the conveying elements to the structure to reciprocate therewith, the elements maintaining contact with their respective bearing surfaces during their reciprocation.

3. Apparatus for conveying material in bulk, which comprises a generally horizontal support including transverse bearing members alternating lengthwise of the support with transverse checking members, each bearing member having an upwardly and forwardly inclined bearing surface at its top with a central opening therethrough and each checking member having an approximately vertical face transverse to the support, and a perforated top extending to the rear, a structure beneath the support mounted for reciprocating lengthwise only of the support, a conveying element resting on the bearing surface of each bearing member, the element having a steep front face and tapering in height to the rear, and means extending through the openings in the bearing members for connecting the conveying elements to the structure to reciprocate therewith, the elements maintaining contact with their respective bearing surfaces during their reciprocation.

4. Apparatus for conveying material in bulk, which comprises a substantially continuous generally horizontal support including spaced stationary transverse bearing members having upwardly and forwardly inclined top bearing surfaces, means providing steep checking walls at the rear ends of the bearing members and a grate supported between the forward end of each bearing member and the adjacent wall, a structure beneath the support mounted for reciprocation lengthwise only of the support, a conveying element resting on the bearing surface of each bearing member, the element having a steep front face and tapering in height to the rear, and means extending through the openings in the bearing members for connecting the conveying elements to the structure to reciprocate therewith, the elements maintaining contact with their respective bearing surfaces during their reciprocation.

5. Apparatus for conveying material in bulk, which comprises a substantially continuous generally horizontal support including spaced stationary transverse bearing members, having upwardly and forwardly inclined top bearing surfaces, means providing steep checking walls at the rear ends of the bearing members, a seat provided on the rearward side of each checking wall, a seat provided on the forward end of each bearing member, and a grate supported on said seats between each bearing member and adjacent wall, a structure beneath the support mounted for reciprocation lengthwise only of the support, a conveying element resting on the bearing surface of each bearing member, the element having a steep front face and tapering in height to the rear, and means extending through the openings in the bearing members for connecting the conveying elements to the structure to reciprocate therewith, the elements maintaining contact with their respective bearing surfaces during their reciprocation.

6. Apparatus for conveying material in bulk, which comprises a substantially continuous generally horizontal support including spaced stationary transverse bearing members having upwardly and forwardly inclined top bearing surfaces, means providing steep checking walls integral with the rear ends of the bearing members, a seat provided on the rearward side of each checking wall, a seat provided on the forward end of each bearing member, and a grate supported on said seats between each bearing member and adjacent wall, a structure beneath the support mounted for reciprocation lengthwise only of the support, a conveying element resting on the bearing surface of each bearing member, the element having a steep front face and tapering in height to the rear, and means extending through the openings in the bearing members for connecting the conveying elements to the structure to reciprocate therewith, the elements maintaining contact with their respective bearing surfaces during their reciprocation.

7. Apparatus for conveying material in bulk, which comprises a substantially continuous generally horizontal support including spaced stationary transverse bearing members having upwardly and forwardly inclined top bearing surfaces and checking members between adjacent bearing members, each checking member including a rear grate section and a forward section made up of a grate and a steep checking wall, a structure beneath the support mounted for reciprocation lengthwise only of the support, a conveying element resting on the bearing surface of each bearing member, the element having a steep front face and tapering in height to the rear, and means extending through the openings in the bearing members for connecting the conveying elements to the structure to reciprocate therewith, the elements maintaining contact with their respective bearing surfaces during their reciprocation.

8. Apparatus for conveying material in bulk, which comprises a substantially continuous generally horizontal support including spaced stationary transverse bearing members having upwardly and forwardly inclined top bearing surfaces and checking members between adjacent bearing members, each checking member including a rear grate section in the plane of one bearing surface and a forward section made up of a grate in the plane of a relatively forward bearing surface, and a steep checking wall, a structure beneath the support mounted for reciprocation lengthwise only of the support, a conveying element resting on the bearing surface of each bearing member, the element having a steep front face and tapering in height to the rear, and means extending through the openings in the bearing members for connecting the conveying elements to the structure to reciprocate therewith, the elements maintaining contact with their respective bearing surfaces during their reciprocation.

9. Apparatus for conveying material in bulk, which comprises a substantially continuous generally horizontal support including spaced stationary transverse bearing members having upwardly and forwardly inclined top bearing surfaces and checking members between adjacent bearing members, each checking member including a rear grate section and a forward section made up of a grate and a steep checking wall, a rearward seat for the rear grate section on the steep checking wall and a forward seat for the rear grate section on a relatively rear bearing member, said seats supporting said rear grate section, a seat on the rear of a forward bearing member supporting the grate of the forward section of each checking member, a structure beneath the support mounted for reciprocation lengthwise only of the support, a conveying element resting on the bearing surface of each bearing member, the element having a steep front face and tapering in height to the rear, and means extending through the openings in the bearing members for connecting the conveying elements to the structure to reciprocate therewith, the elements maintaining contact with their respective bearing surfaces during their reciprocation.

10. Apparatus for conveying material in bulk, which comprises a substantially continuous generally horizontal support including spaced stationary transverse bearing members having upwardly and forwardly inclined top bearing surfaces and checking members between adjacent bearing members, each checking member including a rear grate section sloping downwardly and backwardly and a forward section made up of a grate sloping upwardly and forwardly and a steep checking wall, a structure beneath the support mounted for reciprocation lengthwise only of the support, a conveying element resting on the bearing surface of each bearing member, the element having a steep front face and tapering in height to the rear, and means extending through the openings in the bearing members for connecting the conveying elements to the structure to reciprocate therewith, the elements maintaining contact with their respective bearing surfaces during their reciprocation.

References Cited in the file of this patent

UNITED STATES PATENTS

| | | |
|---|---|---|
| 2,431,799 | Gaffney | Dec. 2, 1947 |
| 2,498,218 | Nielsen | Feb. 21, 1950 |
| 2,592,010 | Cole et al. | Apr. 8, 1952 |

FOREIGN PATENTS

| | | |
|---|---|---|
| 269,732 | Great Britain | Apr. 28, 1927 |